United States Patent [19]

Crawford

[11] Patent Number: 4,903,202

[45] Date of Patent: Feb. 20, 1990

[54] THREE-DIMENSIONAL OBJECT REMOVAL VIA CONNECTIVITY

[75] Inventor: Carl R. Crawford, Milwaukee, Wis.

[73] Assignee: General Electric Company, Milwaukee, Wis.

[21] Appl. No.: 228,891

[22] Filed: Aug. 4, 1988

[51] Int. Cl.[4] .............................................. G06F 15/62
[52] U.S. Cl. ................................ 364/413.13; 382/16; 378/901
[58] Field of Search ..................... 364/413.13; 382/26, 382/27, 16; 378/901

[56] References Cited

U.S. PATENT DOCUMENTS 4,751,643  6/1988  Lorensen et al. .................... 364/414
4,791,567 12/1988  Cline et al. ....................... 364/413.13

OTHER PUBLICATIONS

H. E. Cline et al., "3D Reconstruction of the Brain from Magnetic Resonance Images Using a Connectivity Algorithm", *Magnetic Resonance Imaging*, vol. 5, pp. 345-352, 1987.

Primary Examiner—Clark A. Jablon
Attorney, Agent, or Firm—James O. Skarsten; Douglas E. Stoner

[57] ABSTRACT

Multiple desired objects within a three-dimensional tomographic data set which occupy the same portion of the image histogram with other unwanted objects are separated with reduced reliance on user interaction by applying connectivity to the unwanted objects and setting the voxels to a new value which removes them from the portion of the histogram. Unwanted objects can be identified by examination of the original two-dimensional slices or after examination of a three-dimensional image to excise objects, whereby the invention functions as an electronic scalpel.

6 Claims, 2 Drawing Sheets

THREE-DIMENSIONAL OBJECT REMOVAL VIA CONNECTIVITY

This application is related to U.S. application Ser. No. 228,404 entitled "Three-Dimensional Surface Representation Using Connectivity Method Without Leaks," filed concurrently with this application.

BACKGROUND OF THE INVENTION

The present invention relates in general to three-dimensional (3-D) display of tomographic data, and more specifically to using connectivity to remove unwanted objects and then identifying multiple objects-of-interest using ranging.

Tomographic medical imaging employs the collection of data representing cross sections of a body. A plurality of object interrogations can be processed mathematically to produce representations of contiguous cross-sectional images. Such cross-sectional images are of great value to the medical diagnostician in a non-invasive investigation of internal body structure. Techniques employed to collect the data are, for example, x-ray computed tomography (CT), nuclear magnetic resonance imaging (MR), single photon emission tomography, positron emission tomography, or ultrasound tomography.

A body to be imaged exists in three dimensions. Tomographic devices process data for presentation as a series of contiguous cross-sectional slices along selectable axes through the body. Each cross-sectional slice is made up of a number of rows and columns of voxels (parallelepiped volumes with certain faces corresponding to pixel spacing within each slice and others corresponding to slice spacing), each represented by a digitally stored number related to a computed signal intensity in the voxel. In practice, an array of, for example, 64 slices may each contain 512 by 512 voxels. In normal use, a diagnostician reviews images of a number of individual slices to derive the desired information. In cases where information about a surface within the body is desired, the diagnostician relies on inferences of the 3-D nature of the object derived from interrogating the cross-sectional slices. At times, it is difficult or impossible to attain the required inference from reviewing contiguous slices. In such cases, a synthesized 3-D image is desired.

Synthesizing a 3-D image from tomographic data is a two-step process. In the first step, a mathematical description of the desired object is extracted from the tomographic data. In the second step, the image is synthesized from the mathematical description.

Dealing with the second step first, assuming that a surface description can be synthesized from knowledge of the slices, the key is to go from the surface to the 3-D image. The mathematical description of the object is made up of the union of a large number of surface elements (SURFELS). The SURFELS are operated on by conventional computer graphics software, having its genesis in computer-aided design and computer-aided manufacturing, to apply surface shading to objects to aid in image interpretation through a synthesized two-dimensional image. The computer graphics software projects the SURFELS onto a rasterized image and determines which pixels of the rasterized image are turned on, and with what intensity or color. Generally, the shading is lightest (i.e., most intense) for image elements having surface normals along an operator-selected line of sight and successively darker for those elements inclined to the line of sight. Image elements having surface normals inclined more than 90 degrees from the selected line of sight are hidden in a 3-D object and are suppressed from the display. Foreground objects on the line of sight hide background objects. The shading gives a realistic illusion of three dimensions.

Returning now to the first step of extracting a mathematical description of the desired surface from the tomographic slice data, this step is broken down into two substeps, namely the extraction (i.e., identification) of the object from the rest of the tomographic data, and the fitting of a surface to the extracted object. A surface is fitted to the object by giving a mathematical description to the boundary between the voxels of the object and any non-object voxels. The description can be obtained using the marching cubes, dividing cubes, or cuberille methods, for example. The dividing cubes method is described in U.S. Pat. No. 4,719,585, issued to Cline et al. on Jan. 12, 1988, which is incorporated by reference.

In the dividing cubes method, the surface of interest is represented by the union of a large number of directed points. The directed points are obtained by considering in turn each set of eight cubically adjacent voxels in the data base of contiguous slices. Gradient values are calculated for the cube vertices using difference equations. Each large cube formed in this manner is tested to determine whether the object boundary passes through it. One way to perform this test is to compare the density (i.e., intensity value) at each vertex with a threshold value (or a range between two threshold values) defining the object. If some densities are greater and some less than the threshold (or some within the range and some not), then the surface passes through the large cube. This process will be referred to as thresholding whether using a single threshold or a range (e.g., upper and lower thresholds).

In the event that the surface passes through the large cube, then the cube is subdivided to form a number of smaller cubes, referred to as subcubes or subvoxels. By interpolation of the adjacent point densities and gradient values, densities are calculated for the subcube vertices and a gradient is calculated for the center of the subcube. The densities are tested (e.g., compared to the threshold). If the surface passes through a subcube, then the location of the subcube is output with its normalized gradient, as a directed point. The union of all directed points generated by testing all subcubes within large cubes through which the surface passes, provides the surface representation. The directed points are then rendered (i.e., rasterized) for display on a CRT, for example.

In general, the thresholding method works very well when the voxels corresponding to an object-of-interest are substantially the only ones in the tomographic data that fall within the particular thresholding range (i.e., are the only occupants of the particular neighborhood in the image histogram). This is true of bone in CT and blood vessels in MR, for example. However, many potential objects-of-interest within a body share a density range (or other identifying property), such as various organs in CT measurements. Thresholding alone cannot distinguish between such objects in the same range or having the same property.

A method known as connectivity can be used to separate objects that occupy the same neighborhood in a histogram. In using connectivity, only voxels connected to a user-identified seed voxel in the object-of-interest will be considered during the surface extraction step. A voxel is connected to the seed if and only if (1) the voxel is a neighbor (i.e., adjacent to, in a predefined direction) of the seed or a neighbor of another connected voxel, and (2) the voxel shares a specified property (e.g., falling within the same threshold range) with the seed voxel. Connectivity has been successfully used in generating 3-D CT images of soft tissue structures such as the knee ligaments.

Connectivity begins with a seed voxel in the object-of-interest or with a number of seed voxels in multiple objects-of-interest. Each voxel connected to a seed is marked or flagged. During surface extraction, only voxels that are marked and that satisfy the threshold criterion will be considered.

If the number of objects-of-interest to be viewed is large, then a large number of seeds will be required. For example, it may be desirable to generate a 3-D view of ankle bones where the ankle is surrounded by a cast. Since a cast in a CT exam has approximately the same density value as bone, it is necessary to separate the ankle bones from the cast using connectivity. However, due to the large number of separate bones in the ankle, an undesirably large amount of user interaction is required to manually specify seed voxels for all separate bones.

In another example, a large number of seed voxels need to be specified in multiple portions of the hip bones in order to obtain a 3-D view of the hip with the femur bone removed. Likewise, many seed voxels are required to extract a 3-D surface of the brain without including surrounding fat and ligaments. In each of these cases, the user spends a great deal of time and effort in specifying all of the required seed voxels, thereby reducing the efficiency of the user and the imaging system.

Once a 3-D image is displayed of multiple objects-of-interest, the user may be interested in displaying a subset of the displayed objects. Prior-art systems required re-specification to identify seed voxels in the objects to be displayed, which can also be time consuming.

Accordingly, it is a principal object of the present invention to provide method and apparatus for reducing user interaction required to display multiple objects-of-interest while suppressing display of other objects having the same identifying property.

It is another object to display multiple objects-of-interest in a 3-D format without requiring a seed voxel to be specified in each one.

It is a further object of the invention to selectively delete objects from a display, in the fashion of an electronic scalpel.

SUMMARY OF THE INVENTION

These and other objects are achieved according to a method for generating a three-dimensional surface definition of multiple objects within a three-dimensional tomographic data set including a plurality of voxel data points. Each voxel has a respective density value and the multiple objects include voxels having density values satisfying a predetermined property. The term "density value" is used here in its broad sense of any characteristic being measured of an object, such as x-ray attenuation, nuclear spin relaxation, or ultrasound backscatter coefficient, for example. The method comprises the steps of (1) identifying at least one non-object seed voxel not in the multiple objects but having a density value which satisfies the property, (2) applying connectivity to each non-object seed voxel, (3) modifying the density value of each voxel satisfying connectivity to a value not satisfying the property, and (4) extracting a surface definition of the multiple objects. In a preferred embodiment, step (4) is performed using a threshold without connectivity.

In another aspect of the invention, apparatus is provided having seed means to specify non-object seed voxels. Connectivity means is coupled to the seed means for applying connectivity to the non-object seed voxels. Modifying means is coupled to the connectivity means for modifying, prior to extraction of the multiple objects, the value of each voxel satisfying connectivity to a value not satisfying the predetermined property. The term "modify" is used to indicate either that the voxel value is actually changed or that a flag or a mark is altered or appended to the value. If a flag is used, then a flag test will be incorporated into the neighbor criterion in subsequent steps.

The predetermined property can be any characteristic which defines a collection of voxels within the data set.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figure 1:
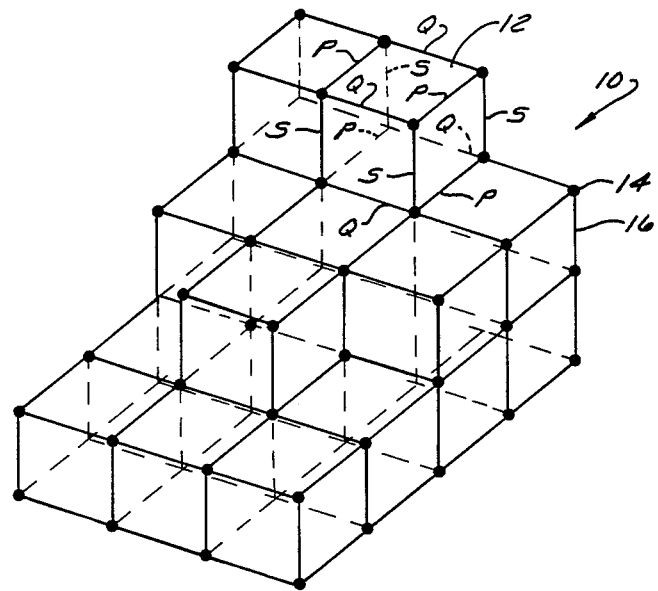
FIG. 1 represents a portion of an array of tomographic data from which a surface is to be extracted.

Referring to FIG. 1, there is shown, generally at 10, a part of a tomographic data set including an array of cubes defined by nodes 14 connected by edges 16. Each node 14 represents a signal amplitude of a voxel of tomographic data and each edge 16 represents the distance from one voxel to its neighbor. Although the volumes described are referred to as cubes, edges 16 are not necessarily all of equal length and are probably not since slice thickness is usually not equal to pixel resolution within the slice. Pixel spacings P and Q and slice spacing S are shown for cube 12.

Figure 2:
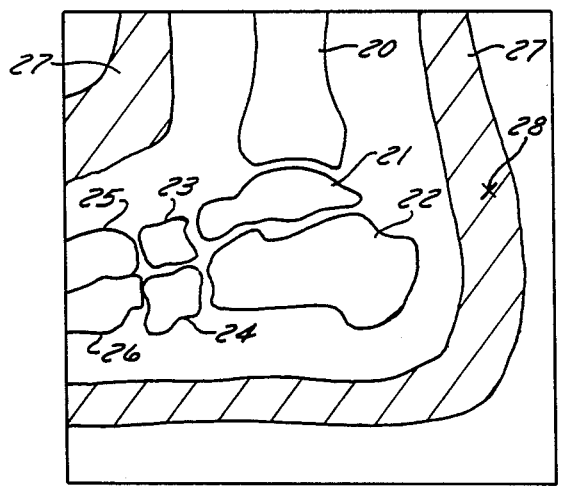
FIG. 2 is a two-dimensional tomographic slice of an ankle in a cast taken in a sagittal plane.

A tomographic imaging system typically acquires data in the form of two-dimensional slices. An example of such a slice is shown in FIG. 2 which represents a CT image of a sagittal plane of an ankle including the bones of the tibia 20, the talus 21, the calcaneus 22, the cuboid 23, the navicular 24, and cuneiforms 25 and 26 surrounded by a cast 27 applied to the ankle of a patient. A plurality of spaced slices covering a volume of interest (e.g., the entire foot of the patient) make up a tomographic data set of which FIG. 2 represents one slice. The slice shown in FIG. 2 is at an angle not normally employed in imaging an ankle, but is being used to most clearly illustrate the invention.

Figure 3:
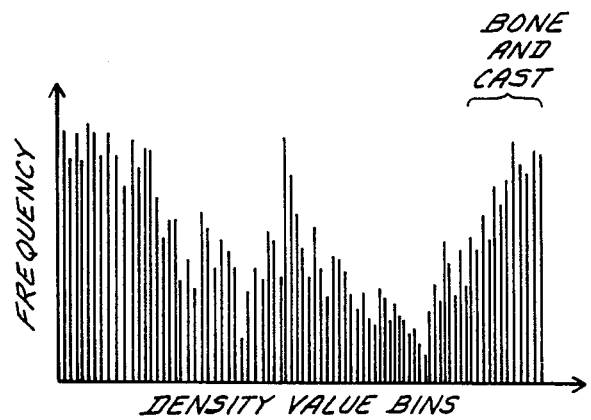
FIG. 3 is a histogram corresponding to a tomographic data set including the slice of FIG. 2.

Consider, for example, the problem of generating a 3-D image of the bones of the ankle. This requires the extraction of a surface definition of the multiple objects-of-interest from the tomographic data set. In this example, connectivity is needed because prior-art thresholding cannot distinguish between cast 27 and the bones of interest. Referring to FIG. 3, an image histogram of the tomographic data set plots density values versus frequency (i.e., the number of voxels having each particular density value) in a plurality of bins. The use of thresholding to extract a surface definition of bone without the cast will not work since bone and cast share the same bins at the upper end of the histogram.

Prior-art connectivity methods prove to be inconvenient and unmanageable in the present example due to the large number of seed voxels that need to be specified so that all of the ankle bones will be included (other bones of the ankle would be shown only in other slices, making it necessary to examine a large number of slices when placing seed voxels). The manual specification of the seed voxels therefore requires an unacceptable amount of user interaction in this example.

Briefly, according to the invention, instead of marking voxels corresponding to the desired, multiple objects, the voxels belonging to the unwanted objects in the thresholding range (i.e., histogram bins) are modified to a value that will fail the thresholding criterion of the desired objects. Having removed any unwanted objects, a single application of thresholding will result in extraction of the multiple objects-of-interest.

Figure 4:
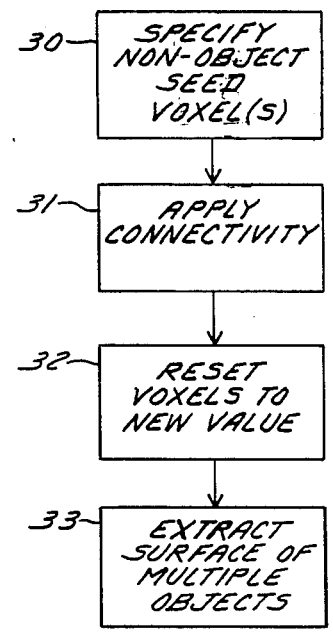
FIG. 4 is a flow chart of a preferred embodiment of a method according to the invention.

A general method according to the invention is summarized in FIG. 4, in which one or more non-object seed voxels are specified (e.g., by a user) in step 30. In the example of FIG. 2, this is accomplished by specifying a seed voxel 28 anywhere in cast 27. It is necessary to specify a seed in only one of the portions of cast 27 shown in FIG. 2 since the remaining portion will be connected through other slices.

Returning to FIG. 4, connectivity is applied to the seed voxel(s) in step 31. The criterion for connectivity preferably takes the form of a range (e.g., of density values or other property) and a definition of potential neighbors to be checked for satisfying the range (e.g., any voxels sharing a face, an edge or a vertex). In step 32, all voxels satisfying connectivity to the seed voxel(s) are reset or modified to a new value so that they no longer share the same histogram neighborhood with the objects-of-interest. Alternatively, the voxels could be flagged. Continuing with the example of FIG. 2, the cast voxel values can be modified to a value at the low end of the histogram (e.g., the value of air), so long as the new value is outside the range for bone. Lastly, a surface definition of the multiple objects is extracted in step 33. Preferably, step 33 is performed using a thresholding criterion since all unwanted objects are now outside of the threshold range for the desired objects. If the cast voxels were flagged instead of changed, then the thresholding criterion should ignore flagged voxels.

Additional advantage may be obtained according to a further preferred embodiment of the invention for interactively removing selected objects from a 3-D image. For example, after viewing a 3-D image of the ankle of FIG. 2, a user may desire to delete the cuboid and navicular bones in order to better visualize the calcaneous bone. The present invention can be used as an electronic scalpel to excise the unwanted objects by specifying appropriate seed voxels, applying connectivity, and modifying the connected voxels. Re-extracting the surface definition then gives the desired image.

Figure 5:
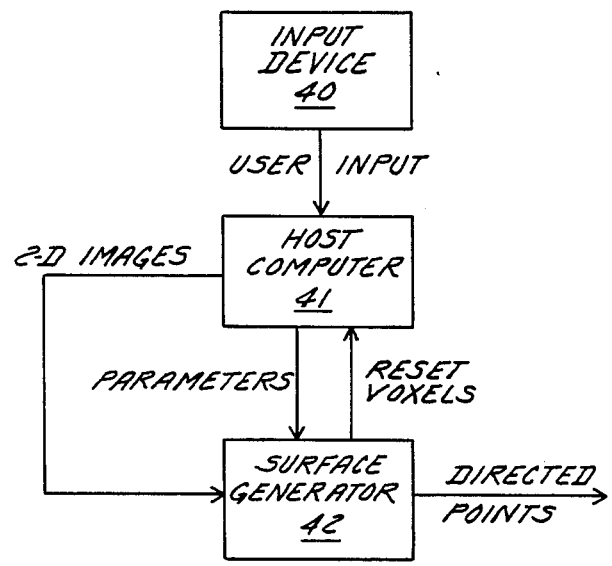
FIG. 5 is a block diagram of a preferred apparatus according to the invention.

A preferred apparatus of the present invention is shown in FIG. 5, which is an improvement of apparatus shown in co-pending application Ser. No. 125,426, filed Nov. 25, 1987, now Pat. No. 4,868,748 which is hereby incorporated by reference in its entirety. A host computer 41 receives image data from a data acquisition system (not shown). Two-dimensional tomographic images are supplied to a surface generator 42 from computer 41. An input device 40, such as a keyboard, trackball, or mouse, supplies user input including seed voxel locations and criterion definitions to computer 41. Parameters such as seed voxel and criterion specifications, interpolation factors for performing the dividing cubes method, and other 3-D image specifications, are provided from computer 41 to surface generator 42. Both connectivity and surface extraction are preferably performed in surface generator 42. The locations of voxels determined to be reset during connectivity of the unwanted objects are provided from generator 42 to computer 41. After surface extraction, a plurality of directed points are provided from generator 42 to image rendering apparatus (not shown).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for generating a three-dimensional surface definition of multiple objects within a three-dimensional tomographic data set. including a plurality of voxel data points, each voxel having a respective density value and said multiple objects including voxels having density values satisfying a predetermined property, said method comprising the steps of:

identifying at least one non-object seed voxel not in said multiple objects but having a density value satisfying said property;

applying connectivity to each non-object seed voxel;

modifying said density value for each voxel satisfying connectivity to a value not satisfying said predetermined property; and extracting a surface definition of said multiple objects from a data subset comprising all voxels having density values which continue to satisfy said predetermined property after said modifying step has been completed.

2. The method of claim 1 wherein said extracting step includes thresholding for defining multiple objects within a range of density values, whereby said three-dimensional surface definition of said multiple objects is generated without specifying seed voxels in said multiple objects.

3. The method of claim 1 wherein said predetermined property is a range of density values.

4. The method of claim 1 further comprising the step of, prior to said identifying step:

viewing a three-dimensional image corresponding to said tomographic data set; and selecting non-objects to be removed.

5. Apparatus for generating a three-dimensional surface definition of multiple objects within a three-dimensional tomographic data set, said data set including a plurality of voxel data points, each voxel having a respective density value, said multiple objects including voxels having density values satisfying a predetermined property, said apparatus comprising:

seed means for specifying at least one non-object seed voxel outside said multiple objects and having said predetermined property;

connectivity means coupled to said seed means for applying connectivity to each non-object seed voxel;

modifying means coupled to said connectivity means for modifying, prior to extraction of said multiple objects, the value of each voxel satisfying connectivity to a value different from the voxel values in said multiple objects; and means for extracting a surface definition of said multiple objects from a data subset comprising voxels having density values satisfying said predetermined property, said subset excluding the voxels having values modified by said modifying means.

6. The apparatus of claim 5 wherein said predetermined property is a range of density values and wherein said apparatus further comprises range means for specifying said range.

* * * * *